US005201104A

United States Patent [19]

Winkeljann et al.

[11] Patent Number: 5,201,104

[45] Date of Patent: Apr. 13, 1993

[54] EXTRACTING TOOL

[75] Inventors: Antonius Winkeljann, Landsberg/Lech; Franz Popp, Buchloe, both of Fed. Rep. of Germany

[73] Assignee: Hilti Aktiengesellschaft, Schaan, Liechtenstein

[21] Appl. No.: 834,169

[22] Filed: Feb. 11, 1992

[30] Foreign Application Priority Data

Feb. 11, 1991 [DE] Fed. Rep. of Germany ....... 4104073

[51] Int. Cl.[5] ........ B23P 19/04

[52] U.S. Cl. ........ 29/256; 29/264; 29/255

[58] Field of Search ........ 29/264, 263, 258, 255, 29/256

[56] References Cited

U.S. PATENT DOCUMENTS 2,305,261 12/1942 Kinley ........ 29/255

4,920,625 5/1990 Smith ........ 29/264

*Primary Examiner*—Bruce M. Kisliuk

*Assistant Examiner*—Eileen P. Morgan

*Attorney, Agent, or Firm*—Anderson Kill Olick & Oshinsky

[57] ABSTRACT

A tool (1) for extracting expansion sleeves (2) of expansion anchor assembles includes an axially extending tubular shaft with a conical external thread (**1*b*) at its leading end to be inserted into a borehole (9) in a structural member (3). The external thread tapers inwardly to the leading end. At its trailing end the shaft (1*a*) has a force applying member or members. The shaft (1*a*) has a central axially extending through hole (1*d*) for laterally enclosing an anchor bolt (4). After the expansion sleeve is relieved of expanding force by hammering the anchor bolt (4) into the borehole, the external thread (1*b*) on the extracting tool (1) is screwed into a gap between the anchor bolt (4) and the expansion sleeve (2). External thread (1*b*) cuts into the inner wall (2*b*) of the expansion sleeve (2) as the extracting tool is screwed in and, as a result, forms a positively locked connection with the expansion sleeve. The expansion sleeve (2) can be pulled out of the borehole (9) in the receiving material (3) by applying an axial force to the force application member (1*c***).

4 Claims, 2 Drawing Sheets

EXTRACTING TOOL

BACKGROUND OF THE INVENTION

The invention is directed to an extracting tool for sleeve or tubular shaped members located in a structural member. The extracting tool has a shaft with a conical external thread at one end with the thread tapering inwardly toward the shaft end. At the opposite end, the shaft has means for applying force to the tool.

A known tool for removing screws has a thread at one end with a very large pitch and means at the other end for applying force. Such means comprises four ground surfaces offset by 90° relative to one another.

This commercially available extracting tool is particularly suitable for removing broken off parts with an external thread from threaded boreholes. Since this known screw extracting tool is a solid member, it has limited uses.

The disadvantage of this tool is that it can not extract a sleeve-shaped member having a shaft or the like extending through a hole in the member.

SUMMARY OF THE INVENTION

Therefore, the primary object of the present invention is to provide an extracting tool with an axially extending central through hole.

When the extracting tool is inserted it laterally encloses any anchor bolt within the expansion anchor assembly. The conical external thread on the tool can be inserted into a gap between the anchor bolt and the expansion sleeve. Preferably, the through hole in the extracting tool has an internal thread in the region of the external thread and the internal thread is adapted to the thread of an anchor bolt which may be located in the expansion sleeve. The axial extent of the internal thread substantially corresponds to the axial extent of the external thread.

The thread pitch of the external thread preferably corresponds to the thread pitch of the internal thread.

When the external thread is screwed in the expansion sleeve, the anchor bolt can undergo an axial movement via the internal thread of the extracting tool when the pitch is not identical. On one hand, this could cause the bolt to contact the base of the borehole and, accordingly, prevent the extracting tool from being screwed in any further. On the other hand, an expansion of the expansion element could be initiated. For this reason, it is advantageous that the two threads have the same pitch.

Preferably, the wall thickness between the internal thread and the external thread decreases toward the leading end of the tool, that is, the end inserted into the sleeve. This feature is achieved with the start of the internal thread and of the external thread located on the same radius extending inwardly from the circumference of the external thread to the axial center of the extracting tool.

Advantageously, the internal thread and the external thread converge toward the leading end of the tool shaft. As a result, a circular cutting edge is formed at the leading end.

Preferably, the external thread is inclined inwardly at an angle in the range of 2° to 7° toward the leading end relative to the axis of the extracting tool. Due to this slight inclination at the leading of the extracting tool, it can be screwed further into the gap between the anchor bolt and the expansion sleeve, so that the external thread cuts a thread into the inner wall of the expansion sleeve for the purpose of axial support.

If there is very little space between the anchor bolt and the expansion sleeve, it is preferably to use an extracting tool with the external thread inclined at an angle of 2°. The flatter the inclination, the more threads can be cut into the inner wall. Greater axial pullout values are achieved in this manner.

If the gap between the anchor bolt and the expansion bolt is relatively large, it is preferably for the external thread of the extracting tool to have an angle in the range of 5° to 7°.

In a preferred embodiment, the external thread is a cutting thread for insuring a connection by a thread-cutting procedure. This thread cutting procedure is further benefitted if the extracting tool is formed of steel which can be cased-hardened.

The use of an extracting tool having a through hole without an internal thread is especially advantageous when there is a large gap between the anchor bolt and the expansion sleeve.

In addition to the thread cutting procedure, an additional wedge-like clamping of the external thread in the expansion sleeve is attained when screwing the conical external thread into the expansion sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
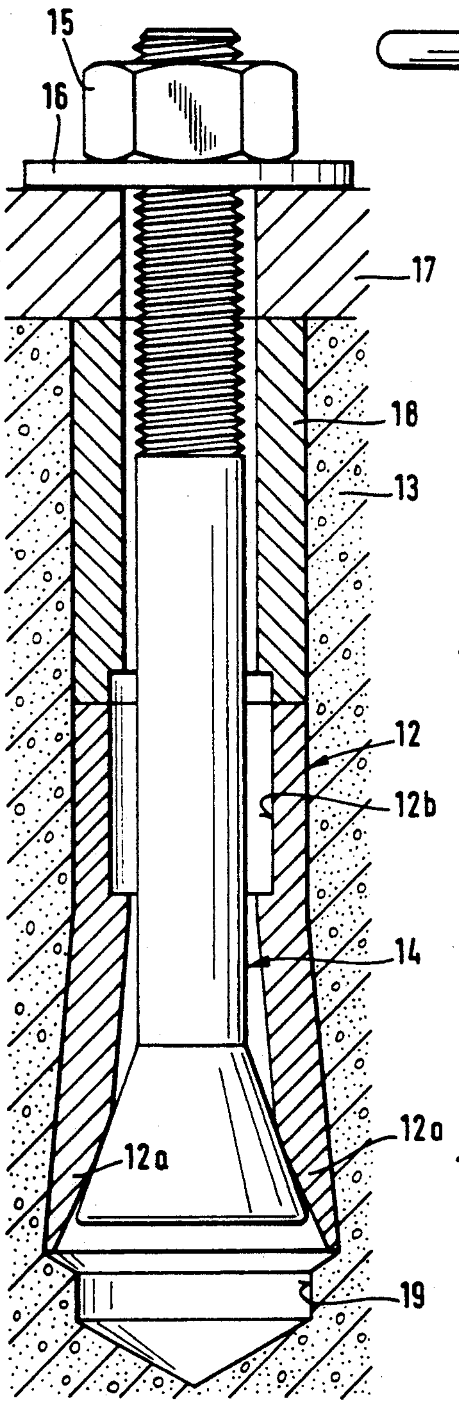
FIG. 1 is an axially extending view, partly in section, of an anchor assembly in the anchored state.

In FIG. 1 an anchor assembly is illustrated made up of an axially elongated anchor bolt 14, an axially extending expansion sleeve 12, a spacer sleeve 18, a washer 16 and a nut 15 threaded onto the anchor bolt. As viewed in FIG. 1 the various parts have a leading end and a trailing end with the leading end located downwardly relative to the trailing end. In other words, the lower conically shaped portion of the anchor bolt 14 is located at the leading end and the nut 15 and washer 16 is located at the trailing end. When an axial force is applied via the nut 15 to the anchor bolt 14 the conically shaped leading end of the anchor bolt effects a radial expansion of the expansion elements **12*a* of the expansion sleeve 12 in the base of the borehole in the structural member 13. Between the leading side of the washer 16 and the surface of the structural member 13 is an element or second structural member 17 to be secured by the anchor assembly to the structural member 13**.

Figure 2:
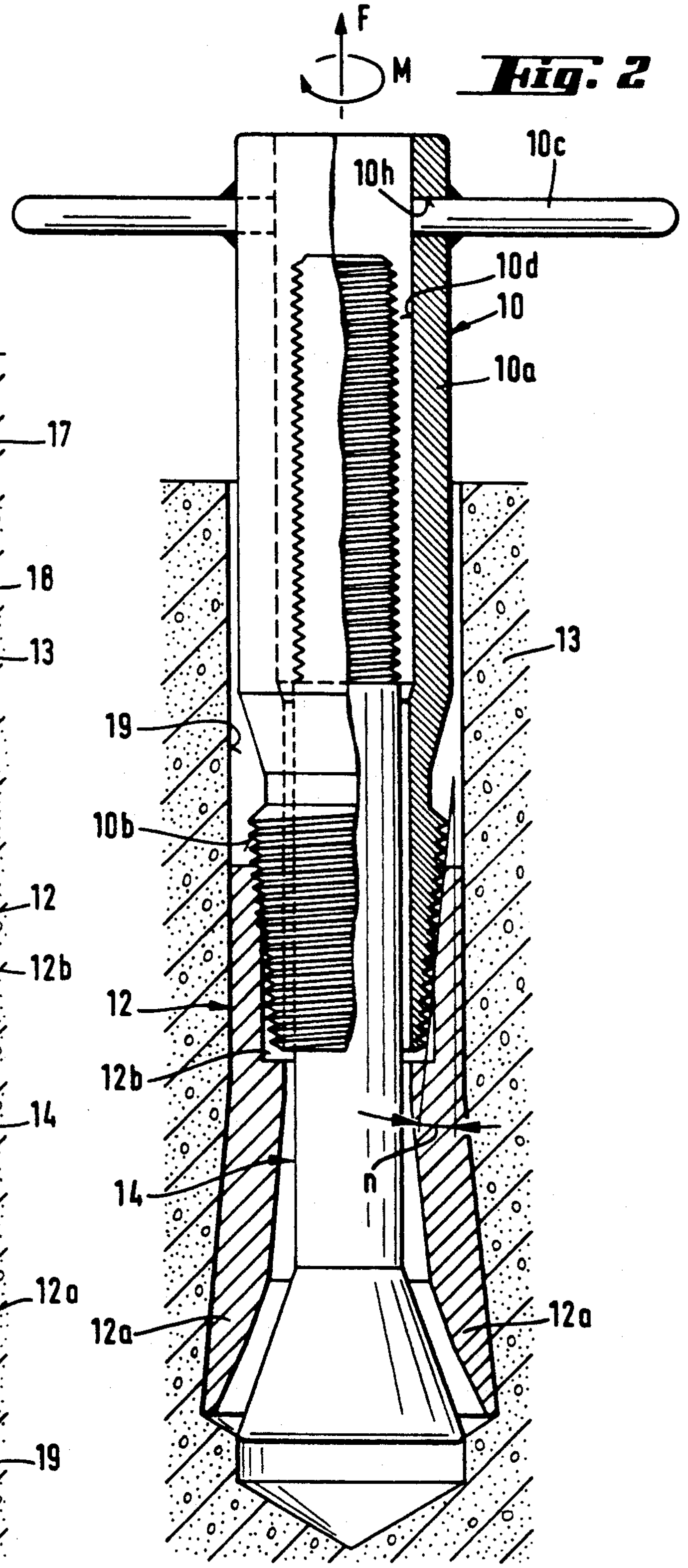
FIG. 2 is a view similar to FIG. 1 illustrating an extracting tool threaded into the expansion sleeve.

FIG. 2 shows an extracting tool 10 with a through hole **10*d* extending from its leading end to its trailing end. The extracting tool has a tubular shaft 10***a* with an outer diameter smaller than the diameter of the borehole 19 in the structural member 13. Extracting tool 10 has a conical external thread 10*b* extending from its leading end toward its trailing end and the external thread tapers inwardly toward the leading end of the shaft 10*a*. A force application means 10*c* is provided in the shaft 10*a* adjacent its trailing end.

The through hole 10*d* in the extracting tool 10 has a greater diameter than the thread diameter of the anchor bolt 14. Expansion sleeve 12 has an axially extending internal widened section extending from its trailing end for a portion of its axial length toward the leading end. This widened section 12*b* serves to receive the screwed in external thread 10*b* of the extracting tool 10, note FIG. 2.

The force application means 10*c* is shown in the form of two pin shaped elements extending perpendicularly to the axis of the extracting tool 10. The pin-shaped elements are inserted into prefabricated holes 10*h* adjacent to the trailing end of the shaft 10*a* and are welded at the outer surface of the extracting tool 10.

Another possibility for forming the force application means 10*c* involves a pin-shaped element inserted through the two boreholes 10*h* and then welded to the shaft 10*a*.

Figure 3:
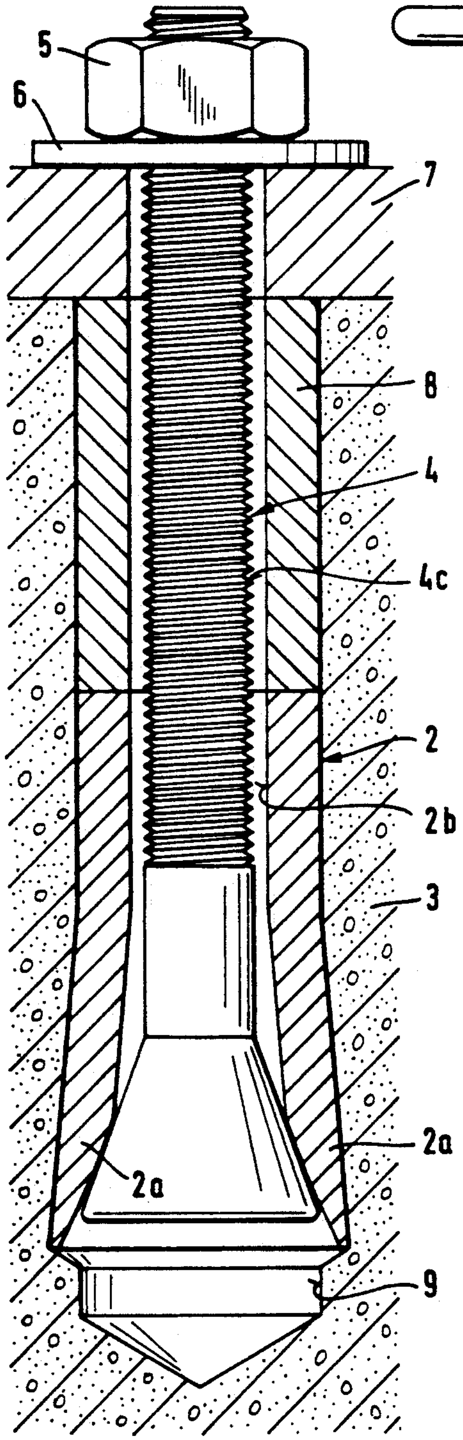
FIG. 3 is a view similar to FIG. 1 illustrating another anchor assembly in the anchored state.

FIG. 3 illustrates another anchor assembly corresponding substantially to the anchor assembly in FIG. 1. The main differences between the two anchor assembles involves the greater length of the thread 4*c* extending from the trailing end toward the leading end of the anchor bolt 4 and in the shape of the expansion sleeve 2 which does not have an axially extending widened portion extending from the trailing end.

Figure 4:
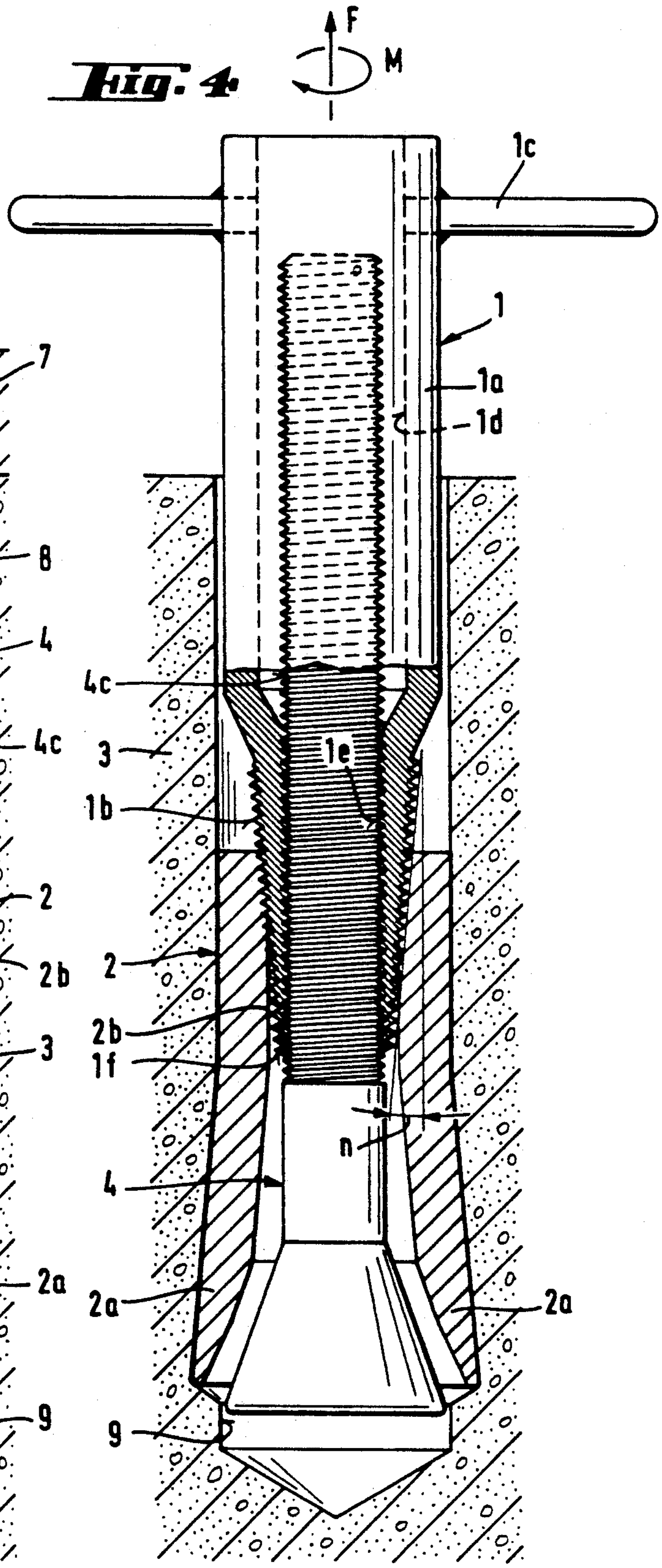
FIG. 4 is a view similar to FIG. 2 displaying another extracting tool threaded into the expansion sleeve.

The extracting tool 1 displayed in FIG. 4 has an internal thread 1*e* at the inner circumference of through hole 1*d* in the shaft 1*a* of the tool and the pitch of the internal thread 1*e* is adapted to the thread pitch on the anchor bolt 4. An external pitch 1*b* extending from the leading end toward the trailing end of the shaft 1*a* has the same pitch as the internal thread 1*e*. The start of the threads 1*b* and 1*e* is on the same radius extending radially outwardly from the center of the extracting tool 1. The axially extending leading end region of the shaft 1*a* widens constantly towards the trailing end of the shaft. As a result, the external thread 1*b* is conically shaped and converges with the internal thread 1*e* in the direction toward the leading end, whereby a circular cutting edge is formed at the leading end 1*f* of the shaft.

Rearwardly toward the trailing end, the through hole 1*d* extending from the trailing end of the internal thread 1*e* is widened, note FIG. 4. As a result of this axially extending widened section of through hole 1*d*, the extracting tool 1 can be used when the anchor bolt is slightly bent.

The procedure for removing the expansion sleeve 2, 12 from a borehole 9, 19 in the structural member 3, 13 is as follows:

Initially the nut 5, 15 is loosened and removed from the trailing end of the anchor bolt 4, 14 along with the washer 6, 16. The component 7, 17 fastened to the structural member 3, 13 is lifted from the structural member, so that the spacer sleeve 8, 18 can be pulled out without difficulty by a tool in the form of pliers. To relieve the expansion sleeve 2, 12 of the expanding force, an axial movement of the anchor bolt 4, 14 in the leading end direction within the borehole 9, 19 must take place. To prevent damage to the thread on the anchor bolt 4, 14, the nut 5, 15 is screwed back onto the trailing end of the anchor bolt 4, 14, so that blows applied to the trailing end of the anchor bolt 4, 14 are intercepted by the nut 5, 15 and are transmitted to the anchor 4, 14 via the thread flanks. The anchor bolt is then in the position shown in FIGS. 2 and 4. The nut 5, 15 is removed from the anchor bolt 4, 14 and the extracting tool is inserted into the borehole 9, 19, wherein the conical external thread 1*b*, 10*b* contacts the inner wall 2*b*, 12*b* of the expansion sleeve 2, 12 for cutting a thread in the inner wall and effecting a positively locked connection.

Since the expansion sleeve 2, 12 generally widened radially to some degree when relieved of its loading, the screwing in process is insured by webs, not shown, which were formed between the expansion segments 2*a*, 12*d* during the expansion operation, and prevent twisting.

After the positively locked connection is produced between the extracting tool 1, 10 and the expansion sleeve 2, 12, an axial pulling force is exerted on the expansion sleeve 2, 12 by the extracting tool 1, 10 so that the expansion elements 2*a*, 12*a* are pressed, radially inwardly together. The extraction of the sleeve from the borehole 9, 19 then proceeds without difficulty. The removal of the expansion sleeve 2, 12 can be facilitated by an impact tool, not shown, arranged to direct an outwardly acting force on the force application means 1*c*, 10*c*. Advantageously, an extracting tool 1, 10 with an internal thread 1*e* is used when there is little play between the anchor bolt 4, 14 and the expansion sleeve 2, 12. When an extracting tool 1, 10 is used where the external thread 1*b*, 10*b* converges with the through hole 1*d*, 10*d*, the residual material cross-section in the region of the thread tooth base is very small. Due to an internal thread 1*e* in the through hole 1*d* with the same thread starting point, this cross-sectional reduction can be avoided in that the tooth tips of the internal thread 1*e* extend into the thread 4*c* of the anchor bolt 4.

While specific embodiments of the invention have been shown and described in detail to illustrate the application of the inventive principles, it will be understood that the invention may be embodied otherwise without departing from such principles.

We claim:

1. Extracting tool (1, 10) for tubular objects (2, 12) located in a bore in a structure member (3, 12), said extracting tool (1, 10) comprising an axially extending shaft (1*a*, 10*a*) having a leading end and a trailing end, said shaft (1*a*, 10*a*) has a conical external thread (1*b*, 10*b*) extending axially from the leading end thereof with the diameter of the external thread increasing towards the trailing end, and means (1*c*, 10*c*) for applying force to the extracting tool (1, 10) located adjacent the trailing end of said shaft (1*a*, 10*a*) said extracting tool (1, 10) has a central through hole extending through said shaft in the axial direction thereof, the through hole (1*d*) has an internal thread (1*e*) in the axially extending region of the external thread (1*b*) and the axial extent of the internal thread (1*e*) corresponds substantially to the axial extent of the external thread (1*b*), wherein the improvement comprises that the external thread (1*b*, 10*b*) has an inclined angle (n) in the range 2° to 7° relative to the axis of said shaft (1*a*, 10*a*) in the direction toward the leading end of said shaft.

2. Extracting tool, as set forth in claim 1, wherein the thread pitch of the external thread (1*b*) corresponds to the thread pitch of the internal thread (1*e*).

3. Extracting tool, as set forth in claim 1, wherein the external thread (1*b*) is a cutting thread.

4. Extracting tool, as set forth in claim 3, wherein the extracting tool (1, 10) is formed of a case-hardened steel.

* * * * *